#

3,578,497
POTATO STARCH PROPERTIES BY CONTROLLED
HEATING IN AQUEOUS SUSPENSION
Erling T. Hjermstad, Cedar Rapids, Iowa, assignor to
Penick & Ford, Limited, Cedar Rapids, Iowa
No Drawing. Filed May 19, 1969, Ser. No. 826,026
Int. Cl. C13l 1/08
U.S. Cl. 127—32          6 Claims

ABSTRACT OF THE DISCLOSURE

Improved paste and gel properties and a higher swelling temperature are imparted to potato starch by heating an aqueous suspension of potato starch at temperatures which are at least initially below the natural gelatinization temperature of the starch, but always below the higher gelatinization temperature attained by the starch due to said heating.

BACKGROUND OF THE INVENTION

Potato starch when gelatinized in water produces pastes which are highly transparent, glossy, viscoelastic, and non-congealing or gelling on cooling. In higher concentration, or in the presence of other igredients in food formulation, potato starch is apt to produce a very gummy or even slimy texture, and, in the untreated state, has not been particularly suitable for use in certain foods such as starch puddings, salad dressings, canned food thickeners, etc.

Attempts have been made to overcome the pronounced gumminess or sliminess of potato starch pastes by giving the granules a slight degree of cross-linking with chemical cross-linking agents, for example, phosphorus oxychloride, epichlorhydrin, acrolein, divinylsulfone, di-epoxy reagents, aldehydes, glycidaldehyde, thermosetting resins or their monomers, etc. While these are effective in changing the paste character of starches such as a waxy-maize, waxy-milo, or tapioca starch, they have not been particularly effective when used with potato starch. These cross-linking reagents are toxic materials and when any are used in the preparation of food starches, great care must be taken to insure that toxic residual reagents or side reaction products do not remain in the food starch.

Another characteristic of untreated potato starch paste is its extreme susceptibility to breakdown in paste viscosity during cooking or when subjected to the shearing action of agitators, pumps, colloid mills, homogenizers, etc. Chemical cross-linking has been used to stabilize potato starch paste viscosity but it has not proved very effective with potato starch as compared with the effect on starches such as waxy maize or waxy sorghum and also has the considerations of toxicity as indicated above.

Another characteristic of untreated potato starch is its relatively low gelatinization temperature range. Depending on its source and treatment during processing, commercial potato starch tends to irreversibly swell when heated in water at temperatures ranging from 125° F. to 140° F. while commercial corn starch starts to swell in the range of 150° F. to 160° F. This readiness to gelatinize is also manifested in the susceptibility to gelatinization by aqueous alkali at relatively low temperatures. This tendency limits the degree to which potato starch can be monofunctionally etherified with hydrophilic alkyl groups such as hydroxy propyl groups, while retaining filterability and washability of the starch-ether product.

It has been known for many years that potato starch is particularly susceptible to change in properties when heated at relatively high temperatures in the presence of a limited proportion of moisture insufficient to cause gelatinization. The changes in properties included raising the swelling temperature, increasing paste shortness, opacity and viscosity stability and increasing tendency to congeal and form gels on cooling and ageing. A moderate degree of crystallinity is imparted as shown by X-ray diffraction patterns. While these effects have been known for about 25 years, no commerical application has been made of this effect. This may be due to the unpredictable nature of the process and difficulty in controlling product characteristics.

It is difficult to uniformly control the heating of large quantities of starch at high moisture content. The moisture tends to concentrate or condense in colder regions or on colder surfaces causing localized starch gelatinization with formation of lumps, balls, flakes, or coatings which contaminate the product. It is also difficult and power-consuming to agitate or stir large masses of moist starch sufficiently to transfer heat.

It has now been discovered that potato starch can be given beneficial changes in properties without the use of chemical reagents by warm-water steeping at a pH close to neutrality. Ordinarily, potato starch when used commercially is fairly rapidly heated to its gelatinization temperature and heating is continued to solvate the granules and produce first a suspension of highly swollen granules and then, as the temperature is raised and heating continued, a highly dispersed hydrosol is formed. The present process avoids swelling and gelatinization of the potato starch.

SUMMARY OF THE INVENTION

According to the present invention, a concentrated, neutral suspension of potato starch, usually up to about 40% dry substance (d.s.), is first heated for a period of time at a temperature below the incipient swelling temperature of the particular batch of starch being treated. The temperature is then gradually raised until a temperature well above the original swelling temperature is attained. During subjection to these elevated temperatures the potato starch undergoes progressive changes in properties, including raising of its swelling temperature. By this means, swelling temperatures are raised as much as 20–30° F. The product after the steeping treatment has a high degree of granule stability. It resists rapid gelatinization and produces a rising or fairly flat viscosity curve on cooling. The pastes of the product are very short textured, non-gummy, non-slimy, cloudy and non-cohesive. They form firm gels on cooling and ageing. The changes imparted are produced entirely without addition of chemical reagents and the products are, therefore, ideally suited for uses in food formulation which require short, non-cohesive texture, paste viscosity stability to heat and shearing action, and in foods which require formation of a gel on cooling or ageing.

It has been discovered that potato starch can be given desirable properties of short, non-cohesive paste texture, higher swelling temperatures, paste viscosity stability, and increased gelling tendency by either a long heating time at a relatively low temperature or by heating short periods of time at successively higher temperatures. Any suspension concentration can be used, providing the suspension is stirrable. Concentrations 20%–40% dry substance are preferred. The pH should be in the neutral range, i.e. about 5.5 to 8.0, especially if acid degradation or alkaline swelling or oxidation is to be avoided. A pH in the range of 6.0–7.5 is preferred.

It is essential that swelling be avoided during the different heating periods; otherwise, higher temperatures will cause the suspensions to gelatinize to an unstirrable, sticky, non-dewaterable state, especially in higher solids suspensions.

Commercial potato starches vary considerably in their gelatinization temperature ranges. Generally, when a suspension of potato starch is cooked or gelatinized under normal cooking procedures it starts to swell wtihin a temperature range of 130° to 140° F. However, occasionally some batches have been found to swell at lower temperatures, for example at 125° F. It is, therefore, preferred in the present process to heat the suspension at an initial temperature of 120° F., though for some batches higher initial temperatures have been used without causing swelling. Each temperature level of heating must be below the original swelling temperature or the swelling temperature attained by the present process.

Swelling temperature or gelatinization temperature can be determined by any of several methods; for example, observing loss of birefringence of the granules under a microscope while raising the temperature, observing the changes in translucency of suspensions, changes in refractive index on heating, or changes in viscosity on heating. It has been found, however, that a relatively simple test is sufficiently accurate to characterize starches for the present process. The test is conducted by agitating a 40% dry substance suspension of potato starch in water at pH 6.5 with a propeller, raising the temperature at about 1° F. per minute and noting the temperature at which the suspension thickens and the vortex created by the propeller disappears. Normal commercial, unmodified potato starch swells between 130° and 135° F. by this test.

In many food formulations, such as salad dressings, canned foods, pie fillings, soup thickeners, etc., untreated potato starch imparts a gummy or slimy texture which is undesirable. By a suitable degree of heating of a water suspension, potato starch can be given varying degrees of paste shortness or decreased paste cohesiveness to make it suitable in consistency for such food uses. Sufficient gelling tendency can be imparted by the present process to make potato starch suitable for use in pudding.

The tendency of untreated potato starch to lose viscosity on cooking under severe conditions of temperature and shearing forces can also be greatly reduced by the present process. By selection of the temperature and time of heating the suspension, varying degrees of viscosity stability can be attained. Viscosity stability is of great importance in certain food formulations requiring retorting or pressure cooking at high temperatures and agitation or pumping at heavy consistencies.

DESCRIPTION OF PREFERRED EMBODIMENTS

Example 1

The purpose of this example is show the effect of prolonged heating of the starch suspensions at different temperature levels.

Unmodified potato starch (commercial starch from Idaho potatoes) was suspended in water in 40% dry substance concentration and the pH of the suspension adjusted to 6.5. Several such suspensions were heated and agitated gently at different temperature levels for at least 20 hours. Before and after the heating period the swelling temperature was determined by agitating a 40% d.s. suspension with a propeller, raising the temperature at around 1° F. per minute and noting the temperature at which the vortex disappears and the suspension becomes semi-solid and unstirable.

| Test | Temp. heated, °F. | Time heated, hrs. | Swelling temp., °F. |
| --- | --- | --- | --- |
| a | None | None | 134 |
| b | 110 | 23 | 140 |
| c | 115 | 23 | 141 |
| d | 120 | 23 | 146 |
| e | 125 | 20 | 147 |
| f | 130 | 20 | 149 |
| g | 130 | 42 | 152 |

The above data show the effect of suspension heating in raising the swelling temperature.

Example 2

This example shows the effect of increasing time of heating at a single temperature level.

Commercial unmodified potato starch was suspended in water in a 40% d.s. concentration at pH 6.5 and agitated at 125° F. for varying periods of time. Swelling temperatures were determined before heating and after each time period by the method in Example 1.

| Time heated at 125° F.: | Swelling temperature, °F. |
| --- | --- |
| None | 130 |
| 1 hr. | 140 |
| 3.5 hrs. | 142 |
| 5 hrs. | 143 |
| 6 hrs. | 145 |
| 17 hrs. | 147 |

Example 3

This example shows the effect of heating a low temperature swelling potato starch for given periods at succesively higher temperatures.

A batch of commercial potato starch having an unusually low swelling temperature was used. This starch swelled to a solid unstirable state when heated in a water suspension at a constant 125° F. with no pre-heating at pH 6.5. A 40% d.s. suspension was heated for given periods of time at successively higher temperature levels and the swelling temperature determined after the final heating. The results are given below.

| Temperature heated, °F. | Hours | | | | | Swelling temp., °F. |
| --- | --- | --- | --- | --- | --- | --- |
| | 120 | 125 | 130 | 135 | 140 | |
| Time | 1 | 1 | 1 | 1 | (1) | <140 |
| Do | 1.5 | 1.5 | 1.5 | 1.5 | 1.5 | 146 |
| Do | 3 | 3 | 3 | 3 | 3 | 150 |

1 40 min. (swelled).

The above data show that a potato starch which swells at 125° F. without pre-treatment can be modified by heating to resist swelling when heated in suspension at temperatures as high as 140° F. No thickening of the suspension occurred at these elevated temperatures. The starch remained in the native, unswollen granule form and was readily filterable and washable without swelling after the heating treatment.

Example 4

The data in this example show the effect of suspension pH on the change in properties of potato starch during suspension heating according to the present invention.

Unmodified commercial potato starch having a swelling temperature of 133° F. as determined in Example 1 was suspended in water in 40% dry substance concentrations. The pH of each suspension was adjusted with a slight amount of HCl or NaOH. The suspensions were heated at different successive temperature levels as follows.

| Degrees F.: | Hours |
| --- | --- |
| 120 | 1 |
| 130 | 2 |
| 135 | 3 |
| 140 | 2 |

The swelling temperatures attained at the different pH levels were determined.

| pH: | Swelling temperature after final heating, °F. |
| --- | --- |
| 5.5 | 143 |
| 6.0 | 147 |
| 6.5 | 151 |
| 7.0 | 150 |
| 7.5 | 149 |
| 8.0 | (Swelled after 1 hr. at 140° F.) |

The above data show that the greatest effect on the starch is obtained at about a neutral condition, i.e., pH in the range of 6.0 to 7.5.

Example 5

The data in this example show that there is no difference in effect of heating at a low temperature for a long period of time in demineralized water and in water of medium hardness.

Unmodified commercial potato starch was suspended in 40% d.s. concentration in water which had been demineralized by pouring through ion exchange units and in water of 5 grains per gallon hardness. The pH of the suspensions was adjusted to 6.5. The suspensions were heated at 120° F. for 18 hours, then dewatered and the starch dried at room temperature. These starches and the untreated base starch were compared by cooking in a Corn Industries Viscometer in 5% dry substance concentration for 30 minutes with a water bath temperature of 210° F. The pastes from the C.I. viscometer runs were used for preparing gels for testing with a Corn Industries Gelometer and for Brookfield viscometer viscosity (20 r.p.m.) at temperature levels of 190° F., 150° F., and 120° F. The above instruments and their use are described in Methods in Carbohydrate Chemistry: vol. IV, by R. L. Whistler, Academic Press, New York, 1964, pp. 117–121, 148–150, and 121–123, respectively. The results obtained are shown in Table I.

TABLE I

| Suspension heating conditions | C.I. viscometer, 5% d.s. concentration, 210° F. bath, pH 7.0 | | | | Brookfield (20 r.p.m.) centipoise | | | Aged paste |
|---|---|---|---|---|---|---|---|---|
| | Temp. initial viscosity, °F. | Peak viscosity, g. cm. | 30' viscosity, g. cm. | Gel, 24 hr., 68° F., g. | 190° F. | 150° F. | 120° F. | |
| None (control) | 144 | 2,040 | 400 | 9 | 2,600 | 3,000 | 4,150 | Clear, slimy. |
| 120° F., 18 hr., demineralized H₂O | 155 | 1,260 | 630 | 26 | 6,000 | 7,000 | 7,600 | Slight cloudy. |
| 120° F., 18 hr., H₂O medium hardness | 155 | 1,080 | 612 | 30 | 6,400 | 7,100 | 7,700 | Do. |

The above data show that water hardness does not affect the changes in swelling temperature and viscosity characteristics of the product. Similar values are obtained using either medium hardness or ion free water. Heating at the low temperature of 120° F. produced considerable improvement in the viscosity and gel character of the potato starch.

Example 6

The effect of heating potato starch suspensions under varying conditions for different time periods are shown in this example.

Potato starch suspensions were made up as in Example 5, using water of medium hardness. Heating temperature, time, and pH were varied. The starches after heating were dewatered, dried at room temperature, and compared using the Corn Industries viscometer, Corn Industries gelometer, and Brookfield viscometer as in Example 5. The suspension heating conditions for the various tests are shown in Table II. Properties of the starches produced in the tests are shown in Table III.

TABLE II

| Test: | Heating conditions |
|---|---|
| 1 | None. |
| 2 | 120° F.—1 hr. / 130° F.—18 hrs. / pH 6.5. |
| 3 | 120° F.—1 hr. / 130° F.—1 hr. / 135° F.—18 hrs. / pH 6.5. |
| 4 | 120° F.—1 hr. / 130° F.—2 hrs. / 135° F.—3 hrs. / 140° F.—2 hrs. / pH 6.0. |
| 5 | 120° F.—1 hr. / 130° F.—2 hrs. / 135° F.—3 hrs. / 140° F.—2 hrs. / pH 6.5. |
| 6 | 120° F.—1 hr. / 130° F.—2 hrs. / 135° F.—3 hrs. / 140° F.—2 hrs. / pH 7.0. |
| 7 | 120° F.—1 hr. / 130° F.—1 hr. / 133° F.—8 hrs. |
| 8 | 120° F.—1 hr. / 130° F.—1 hr. |

TABLE III

| | C.I. viscometer—5% d.s. concentration—210° F. bath—pH 7.0 | | | | | Brookfield (20 r.p.m.) centipoise | | | Aged paste |
|---|---|---|---|---|---|---|---|---|---|
| | Temp. initial viscosity, °F. | Time to reach peak, min. | Peak viscosity (g. cm.) | 30', viscosity (g. cm.) | Gel, 24 hr., 68° F. (gram) | 190° F. | 150° F. | 120° F. | |
| Test: | | | | | | | | | |
| 1 | 144 | | 2,040 | 400 | 9 | 2,600 | 3,000 | 4,150 | Clear, slimy. |
| 2 | 172 | 20 | 1,035 | 900 | 100 | 8,100 | 8,900 | 9,700 | Cloudy, gelled. |
| 3 | 175 | 21 | 1,080 | 990 | 110 | 10,100 | 12,000 | 13,500 | Do. |
| 4 | 175 | 25 | 828 | 792 | 115 | 8,500 | 9,700 | 9,700 | Cloudy, non-cohesive. |
| 5 | 174 | 20 | 1,125 | 990 | 130 | 9,050 | 10,300 | 11,400 | Cloudy, gelled. |
| 6 | 178 | 25 | 900 | 855 | 130 | 8,650 | 9,800 | 11,000 | Do. |
| 7 | 172 | 25 | 876 | 860 | 145 | 8,600 | 9,200 | 10,100 | Do. |
| 8 | 180 | 30 | 680 | 680 | 210 | 7,300 | 9,000 | 11,400 | Do. |

The abve data in Table III show the raising of swelling temperature (temperature initial viscosity) as compared with that of untreated potato starch, as the time and temperatures of treatments are increased. Peak viscosities are considerably lowered and the pastes resist viscosity breakdown, as indicated by the high values obtained after 30 minutes of continuous shearing agitation at high temperatures. Gel strengths of the pastes are substantially increased as well as Brookfield viscosity, especially on cooling to lower temperatures.

Having described the invention, what is claimed is:

1. A process for treating potato starch to effect an increase in the swelling temperature and improve the paste and gel properties of said potato starch while maintaining said potato starch in the substantailly unswollen native granule state, which process comprises forming a stirrable aqueous suspension of potato starch granules at a pH in the range of about 5.5 to about 8.0 and maintaining the temperature of said suspension below the swelling temperature of the starch and above about 100° F. for a time of at least about one hour, which time is sufficient to cause an increase in the swelling temperature of said potato starch.

2. The process of claim 1 wherein the temperature of said suspension is first maintained at a temperature of about 5 to 10° F. below the swelling temperature of said starch for about 1 hour and then gradually increased to about 140° F.

3. The process of claim 1 wherein the pH of said suspension is maintained in the range of about 6.0 to about 7.5.

4. The process of claim 1 wherein the temperature of said suspension is gradually raised to above the natural swelling temperature of the starch but below the swelling temperature attained by the starch due to said heating, and maintaining the starch during said heating in a readily filterable, substantially unswollen, native granule state.

5. Potato starch in the substantially unswollen native granule state which has been treated according to the process of claim 1.

6. A process for increasing the swelling temperature of potato starch while maintaining said potato starch in the substantially unswollen native granule state, which process comprises forming a slurry of potato starch granules in water, heating said slurry to a temperature in the range of about 100 to 125° F. and maintaining said slurry at said temperature for at least one hour.

References Cited
UNITED STATES PATENTS

| | | | |
|---|---|---|---|
| 2,332,320 | 10/1943 | Kerr | 127—71 |
| 3,300,316 | 1/1967 | Cooper | 99—139X |

MORRIS O. WOLK, Primary Examiner

S. MARANTZ, Assistant Examiner

U.S. Cl. X.R.

99—139; 127—71